(12) United States Patent
Morimura

(10) Patent No.: US 11,571,775 B2
(45) Date of Patent: Feb. 7, 2023

(54) MACHINE TOOL

(71) Applicant: OKUMA Corporation, Aichi (JP)

(72) Inventor: Shoichi Morimura, Aichi (JP)

(73) Assignee: OKUMA CORPORATION, Aichi (JP)

( * ) Notice: Subject to any disclaimer, the term of this patent is extended or adjusted under 35 U.S.C. 154(b) by 364 days.

(21) Appl. No.: 16/986,773

(22) Filed: Aug. 6, 2020

(65) Prior Publication Data
US 2021/0039212 A1 Feb. 11, 2021

(30) Foreign Application Priority Data

Aug. 6, 2019 (JP) .............................. JP2019-144867

(51) Int. Cl.
| | | |
|---|---|---|
| *B23Q 7/04* | (2006.01) | |
| *B23B 15/00* | (2006.01) | |
| *B23Q 11/10* | (2006.01) | |
| *B25J 15/04* | (2006.01) | |
| *B25J 17/02* | (2006.01) | |
| *B25J 15/00* | (2006.01) | |

(52) U.S. Cl.
CPC .............. *B23Q 7/046* (2013.01); *B23Q 11/10* (2013.01); *B23Q 7/04* (2013.01); *B25J 15/0019* (2013.01); *B25J 15/04* (2013.01); *B25J 17/02* (2013.01)

(58) Field of Classification Search
CPC ............................ Y10T 29/5109–5114; Y10T 409/305656–305824; Y10T 409/308792–30896; Y10T 408/545; Y10T 409/10–109699; B23B 1/00–25/065; B23C 1/14; B23F 1/00–19/125; B23Q 7/04–7/048

USPC ........ 29/27 R–27 C; 409/165–168, 221–224, 409/1–62; 408/71; 451/134, 140–149, 451/173, 189, 209–210, 218–223, 451/227–228, 242–258, 268–269, 451/274–292, 217, 324–325, 379, 385, 451/394, 397–401, 413
See application file for complete search history.

(56) References Cited

U.S. PATENT DOCUMENTS

| | | | | |
|---|---|---|---|---|
| 3,259,958 | A * | 7/1966 | Lemelson | B23Q 39/02 408/35 |
| 10,632,611 | B2 * | 4/2020 | Morimura | B23Q 17/20 |

(Continued)

FOREIGN PATENT DOCUMENTS

| | | |
|---|---|---|
| JP | S5966589 U | 5/1984 |
| JP | S62184513 U | 11/1987 |

(Continued)

*Primary Examiner* — Erica E Cadugan
(74) *Attorney, Agent, or Firm* — Cantor Colburn LLP

(57) ABSTRACT

A machine tool is disclosed. The machine tool includes a robot which is compact and which enables easy use of different end effectors for respective purposes. An internal robot includes a plurality of joints that are composed of a base joint and parallel joints, and a plurality of links. The distal end is split into two or more branches, each having a tool changer. An end effector is detachably attachable to each of the tool changers. Rotation of the base joint causes a change between a first tool-following position and a second tool-following position, so that different end effectors are used for respective purposes by using an end effector attached to a tool changer in the first tool-following position and using an end effector attached to another tool changer in the second tool-following position.

7 Claims, 8 Drawing Sheets

(56) References Cited

U.S. PATENT DOCUMENTS

| | | |
|---|---|---|
| 2007/0156122 A1 | 7/2007 | Cooper |
| 2017/0326700 A1* | 11/2017 | Morimura ............ B23Q 11/005 |
| 2017/0329316 A1* | 11/2017 | Morimura ............ B25J 15/0066 |
| 2018/0126567 A1* | 5/2018 | Morimura .............. B23Q 17/09 |
| 2019/0168380 A1 | 6/2019 | Morimura |

FOREIGN PATENT DOCUMENTS

| | | |
|---|---|---|
| JP | 2010516398 A | 5/2010 |
| JP | 2019098479 A | 6/2019 |

\* cited by examiner

FLUID SUCH AS CUTTING WATER

FLUID SUCH AS CUTTING WATER

MACHINE TOOL

CROSS REFERENCE TO RELATED APPLICATION

This application claims priority to Japanese Patent Application No. 2019-144867 filed on Aug. 6, 2019, which is incorporated herein by reference in its entirety including the specification, claims, drawings, and abstract.

TECHNICAL FIELD

The present disclosure relates to a machine tool and, in particular, to a machine tool that includes an internal robot.

BACKGROUND

There are demands for further automation of machine tools. One solution is to use a robot inside a machine tool. Using a robot enables performance of various tasks; for example, attachment or detachment of tools or workpieces; cleaning of, for example, the space inside the machine tool, tools, and workpieces; prevention of adhesion of swarf; and prevention of chattering of workpieces.

A structure of a robot is described in JP S59-66589 U, which discloses a robot hand including a first arm disposed at right angles at the tip of a pivot that is axially movably positionable and pivotably positionable; a second arm disposed at the end of the first arm to be pivotably positionable and to form a shape of the letter T; cylinders disposed at symmetric positions on respective ends of the second arm to be capable of pushing back by hydraulically pivoting means, each cylinder having grippers on its outer end; and cylinder piston rods each connected to a gripper opening and closing member.

Incorporation of a robot inside a machine tool imposes a big challenge in that the robot should be compact. To address this challenge, a commonly assigned prior application published as JP 2019-98479 A discloses a three degrees of freedom SCARA robot that is made compact by configuring the robot to be rotatable at its base portion and positioning links at heights where they do not interfere with the tool post.

However, when a robot incorporated inside a machine tool performs various tasks, different end effectors are used for respective purposes. Changing end effectors according to the types of tasks consumes time, resulting in spending unproductive time for processes other than machining. For typical robots, a large end effector having a plurality of functions is used; however, such a large end effector often cannot be used for a robot incorporated inside a machine tool. The structure disclosed in JP 2019-98479 A also has a constraint in that the end effector is unable to freely assume any position. As such, a structure that enables easier use of different end effectors for respective purposes is awaited.

SUMMARY

The present disclosure provides a machine tool that includes a robot that enables easy use of different end effectors for respective purposes.

According to one aspect of the present disclosure, there is provided a machine tool comprising a tool post configured to hold one or more tools, the tool post being linearly movable in a direction parallel to a first axis and in a direction parallel to a second axis that is orthogonal to the first axis; a workpiece spindle device configured to hold a workpiece rotatably about an axis parallel to the second axis; and an internal robot placed in a machining chamber, the internal robot having a plurality of joints and a plurality of links connecting the plurality of joints, wherein the plurality of joints of the internal robot include a base joint that is rotatable about an axis parallel to the second axis; and a plurality of parallel joints that are rotatable about axes that are orthogonal to the axis of rotation of the base joint, the plurality of parallel joints being disposed closer to a distal end of the internal robot than is the base joint, wherein the axis of rotation of the base joint is shifted from the axis of rotation of the workpiece spindle device, and wherein the internal robot is configured to change upon rotation of the base joint between a first tool-following position in which the axes of rotation of the plurality of parallel joints are parallel to a third axis that is orthogonal to the first axis and the second axis and a second tool-following position in which the base joint is rotated 180 degrees with respect to the first tool-following position, the plurality of links other than a distal end link being attached at positions so as to be free from interference with the tool post and the one or more tools held by the tool post regardless of whether the internal robot is in the first tool-following position or in the second tool-following position.

According to the present disclosure, as the internal robot changes between the first tool-following position and the second tool-following position upon rotation of the base joint of the internal robot about an axis parallel to the second axis; that is, an axis parallel to the axis of rotation of the workpiece spindle device that rotatably holds a workpiece, a first end effector is used in the first tool-following position, and a second end effector is used in the second tool-following position. This structure enables use of different end effectors for respective purposes without changing end effectors according to the types of tasks. As the plurality of links of the internal robot other than the distal end link are attached at positions so as to be free from interference with the tool post and the one or more tools held by the tool post regardless of whether the internal robot is in the first tool-following position or in the second tool-following position, the end effector's tool-following movement ensures assistance of machining operations or performance of monitoring tasks.

In one embodiment of the present disclosure, the distal end of the internal robot is split into two or more branches, to each of which an end effector is detachably attachable.

In another embodiment of the present disclosure, the distal end of the internal robot is split into two branches, to which a first end effector and a second end effector are detachably attachable, and the first end effector and the second end effector are used for respective purposes in the first tool-following position and the second tool-following position.

In still another embodiment of the present disclosure, at least one of the first end effector and the second end effector is sized to be smaller than a gap between two adjacent links.

In still another embodiment of the present disclosure, at least one of the first end effector and the second end effector is selected from a hand, a roller, and a fluid nozzle.

In still another embodiment of the present disclosure, the distal end of the internal robot is split into two or more branches, to which a single end effector is detachably attachable.

In still another embodiment of the present disclosure, the end effector has a plurality of functions, and the plurality of functions are used for respective purposes in the first tool-following position and the second tool-following position.

As the present disclosure enables use of different end effectors for respective purposes, a reduction in frequency of changing end effectors can shorten the down time of the machine tool.

BRIEF DESCRIPTION OF DRAWINGS

Embodiments of the present disclosure will be described based on the following figures, wherein.

DESCRIPTION OF EMBODIMENTS

Embodiments of the present disclosure will be described below with reference to the accompanying drawings.

Figure 1:
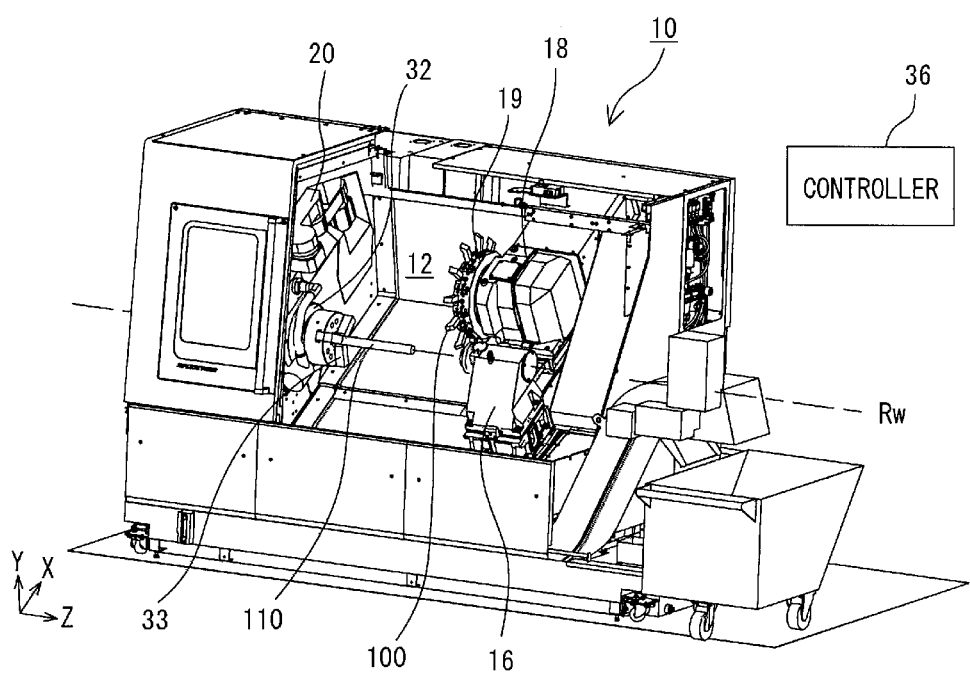
FIG. 1 illustrates a structure of a machine tool according to an embodiment.

FIG. 1 illustrates a structure of a machine tool 10. In the following description, a direction parallel to an axis of workpiece rotation Rw of a workpiece spindle 32 is referred to as a Z axis, a direction parallel to a direction of movement of a tool post 18 that is orthogonal to the Z axis is referred to as an X axis, and a direction orthogonal to both the X axis and the Z axis is referred to as a Y axis. On the Z axis, a direction from the workpiece spindle 32 toward a tail stock 16 is defined as a positive direction; on the X axis, a direction from the workpiece spindle 32 toward the tool post 18 is defined as a positive direction; and on the Y axis, an upward direction from the workpiece spindle 32 is defined as a positive direction. In the following description, the expression that an end effector "makes access to" an object indicates that the end effector attached to an internal robot 20 is moved to a position where the end effector is located close enough to the object to carry out its assigned task.

The machine tool 10 is a lathe for machining a workpiece 110, in which the rotating workpiece 110 is machined by bringing a tool 100 held by the tool post 18 into contact with the workpiece 110. More specifically, the machine tool 10 is an NC (numerically-controlled) turning center having a turret 19 that holds a plurality of tools 100. A machining chamber 12 of the machine tool 10 is surrounded by a cover (partially not illustrated). The machining chamber 12 has on its front a large opening, which is closed or opened by a door (not illustrated). An operator of the machine tool 10 makes access to components inside the machining chamber 12 through this opening. During a machining process, the door provided at the opening is closed for safety, environmental, and other considerations.

The machine tool 10 includes a workpiece spindle device that rotatably holds one end of the workpiece 110, the tool post 18 that holds one or more tools 100, and the tail stock 16 that supports the other end of the workpiece 110. The workpiece spindle device includes a head stock that incorporates a drive motor and other components, and the workpiece spindle 32 that is attached to the head stock. The workpiece spindle 32 includes a chuck 33 and a collet that detachably hold the workpiece 110, and the workpiece 110 held on the workpiece spindle 32 can be changed to another one as needed. The workpiece spindle 32 and the chuck 33 are rotatable about the axis of workpiece rotation Rw that extends in a horizontal direction (the Z axis direction in FIG. 1).

The tail stock 16 is disposed to oppose the workpiece spindle 32 in the Z axis direction; while the workpiece 110 is held by the workpiece spindle 32, the tail stock 16 supports the other end of the workpiece 110. The tail stock 16 is mounted at a position where the center axis of the tail stock 16 is in alignment with the axis of workpiece rotation Rw. A center that has a conical shape with a pointed tip is attached to the tail stock 16, and during a machining process, the tip of the center is brought into contact with a center point of the workpiece 110. The tail stock 16 is movable in the Z axis direction so that it can come into contact with or be spaced away from the workpiece 110.

The tool post 18 holds one or more tools 100, such as a tool called a bite. The tool post 18 is movable along the Z axis, or, in other words, in a direction parallel to the axis of the workpiece 110. As the tool post 18 is placed on a guide rail that extends in a direction parallel to the X axis, or, in other words, in a radial direction of the workpiece 110, it is also movable back and forth in the direction parallel to the X axis.

As illustrated in FIG. 1, the X axis is inclined with respect to the horizontal direction such that it goes upward as it goes inward as viewed from the opening of the machining chamber 12. The turret 19 that can hold a plurality of tools 100 is provided at the tip of the tool post 18. The turret 19 is rotatable about an axis parallel to the Z axis. As the turret 19 is rotated, the tool 100 that is to be used for machining the workpiece 110 is changed as needed. As the tool post 18 is moved in the direction parallel to the Z axis, the tools 100 held by the turret 19 are moved in the direction parallel to the Z axis. As the tool post 18 is moved in the direction parallel to the X axis, the tools 100 held by the turret 19 are moved in the direction parallel to the X axis. As the tool post 18 is moved in the direction parallel to the X axis, a depth of cut into the workpiece 110 or any of other features of the cut made by one of the tools 100 is changed. The tools 100 attached to the tool post 18 can be moved in a plane parallel to an XZ plane. In the following description, this plane in which the tools 100 are moved is referred to as a "plane of movement" of the tools.

The machining chamber 12 houses the internal robot 20. In the example illustrated in FIG. 1, a base portion of the internal robot 20 is attached to one of walls of the machining chamber 12 from which the workpiece spindle 32 protrudes. The base portion of the internal robot 20 is located above the workpiece spindle 32 and closer to the door than is the workpiece spindle 32. The internal robot 20 is used for, for example, assisting machining operations, sensing various parameters, and performing auxiliary operations.

A controller 36 controls actuation of components in the machine tool 10 in accordance with instructions from the operator of the machine tool 10. The controller 36 is composed of, for example, a CPU for performing various computing operations, and a memory for storing various control programs and control parameters. The controller 36 has a communication function, and can exchange various types of data such as NC program data with other devices. The controller 36 may include, for example, a numerical control device that calculates positions of the tool 100 and the workpiece 110 as needed. The controller 36 may be implemented by a single device or may be composed of a combination of a plurality of processors.

Figure 2:
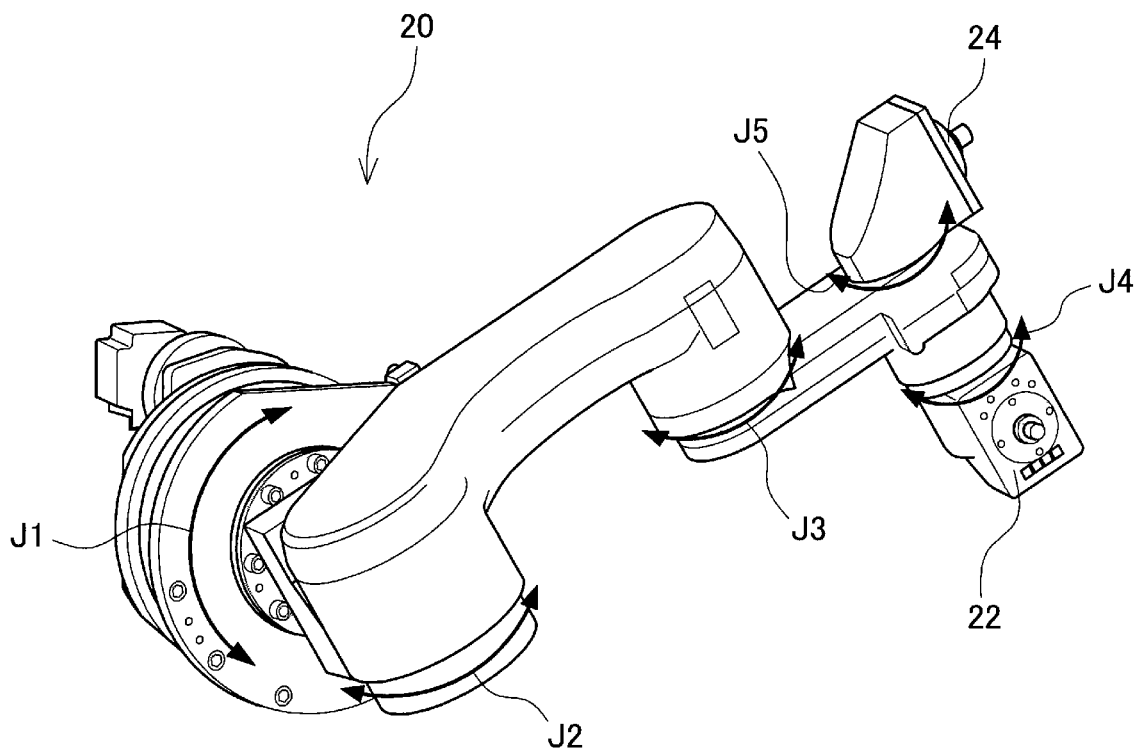
FIG. 2 is a perspective view of an internal robot according to the embodiment.
Figure 2:
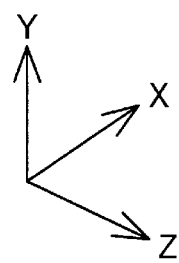

FIG. 2 illustrates a structure of the internal robot 20. The internal robot 20 is an articulated robot having a plurality of links and a plurality of joints J1 to J5 through which the plurality of links are connected. An actuator such as a motor is attached to each of the joints J1 to J5, and actuation of the actuators is controlled by control signals from the controller 36.

The joints J1 to J5 are rotatable in directions indicated by arrows in the drawings. The joint J1 that is located closest to the base portion is referred to as base joint, and the joints J2 to J5 that are adjacent to each other and located closer to the distal end than is the joint J1 are referred to as parallel joints. The joint J1 serving as the base joint has an axis of rotation about the Z axis that is parallel to the workpiece spindle 32. However, the axis of rotation of the joint J1 is shifted from the axis of rotation of the workpiece spindle 32 upward and toward the front (closer to the door). The joints J2 to J5 serving as the parallel joints are rotary joints configured to rotate about axes parallel to each other, and the axes of rotation of the joints J2 to J5 are orthogonal to the axis of rotation of the joint J1.

The internal robot 20 has, at its distal end, a tool changer 22 that is attached via the distal end link and the joint J4, and a tool changer 24 that is attached via the distal end link and the joint J5. An end effector is detachably attachable to each of the tool changers 22 and 24. As such, two end effectors may be attached to the distal end of the internal robot 20 simultaneously.

An end effector is a component that makes access to an object and performs a certain action on the object. Although the end effectors may be undetachably attached to the internal robot 20, in preferred embodiments, the end effectors are detachably attached to the internal robot 20, so as to increase versatility of the internal robot 20.

Any end effectors configured to perform a certain action may be used without any particular limitation. As such, for example, a holder device for holding an object may be used as an end effector. The holder device may hold an object in any manner such as a hand form in which a pair of components pinch an object therebetween, a form in which an object is held under suction, or a form in which an object is held using magnetic or other force.

In another embodiment, a sensor for sensing, for example, information concerning an object and an environment around the object may be used as an end effector. The sensor may be, for example, a contact sensor for detecting whether or not contact with the object occurs, a distance sensor for detecting a distance to the object, a vibration sensor for detecting vibrations of the object, a pressure sensor for detecting a pressure applied from the object, or a temperature sensor for detecting a temperature of the object. The results of detection from such a sensor are stored in association with position information of the end effector calculated from the amounts of actuation of the joints, and then analyzed. For example, in an embodiment in which a contact sensor serves as the end effector, the controller 36 analyzes, for example, the position, shape, and movement of the object based on the time at which contact with the object is detected, and the position information obtained at that time.

In still another embodiment, a pressing mechanism for pressing the object may be used as an end effector. Specifically, the end effector may be, for example, a roller that is pressed against the workpiece 110 to reduce vibrations of the workpiece 110. In a further embodiment, the end effector may be a device for ejecting fluid for assisting machining operations. Specifically, the end effector may be a device for ejecting, for example, air for blowing away swarf, or cooling fluid (such as cutting oil or cutting water) for cooling the tool 100 or the workpiece 110. In a still further embodiment, the end effector may be a device for emitting energy or material for workpiece forming. As such, the end effector may be a device for emitting energy such as laser or arc, or may be a device for emitting material for lamination forming. In a still further embodiment, the end effector may be a camera for capturing an image of the object. In this embodiment, the image captured by the camera may be displayed on, for example, an operation panel.

In the illustrated embodiment, the internal robot 20 has the two tool changers 22 and 24, and different types of end effectors may be attached to these tool changers 22 and 24. The base portion of the internal robot 20; that is, the joint J1, is actuated to rotate, so that the plane of movement of the lathe tool and the plane of movement of the end effector attached to the tool changer 22 of the internal robot 20 can be aligned with each other. At this position, the axes of rotation of the joints J2 to J5 serving as the parallel joints are parallel to the Y axis. As a result, the end effector attached to the tool changer 22 of the internal robot 20 can assist or monitor the cutting or machining operations as it moves following the movement of the tool 100. This position is referred to as first tool-following position.

As the joint J1 is rotated 180 degrees, the positions of the tool changer 22 and the tool changer 24 of the internal robot 20 are reversed, and then the positions of the end effector attached to the tool changer 22 and the end effector attached to the tool changer 24 are also reversed, so that the plane of movement of the lathe tool and the plane of movement of the end effector attached to the tool changer 24 of the internal robot 20 can be aligned with each other. At this position as well, the axes of rotation of the joints J2 to J5 serving as the parallel joints are parallel to the Y axis. As a result, the end effector attached to the tool changer 24 of the internal robot 20 can assist or monitor the cutting or machining operations as it moves following the movement of the tool 100. This position is referred to as a second tool-following position.

Switching from the first tool-following position to the second tool-following position or switching from the second tool-following position to the first tool-following position enables use of two different end effectors for respective purposes. The controller 36 calculates the position of the distal end of the internal robot 20; that is, the position of an end effector, based on the amounts of actuation of the actuators provided at the joints J1 to J5.

Figure 3:
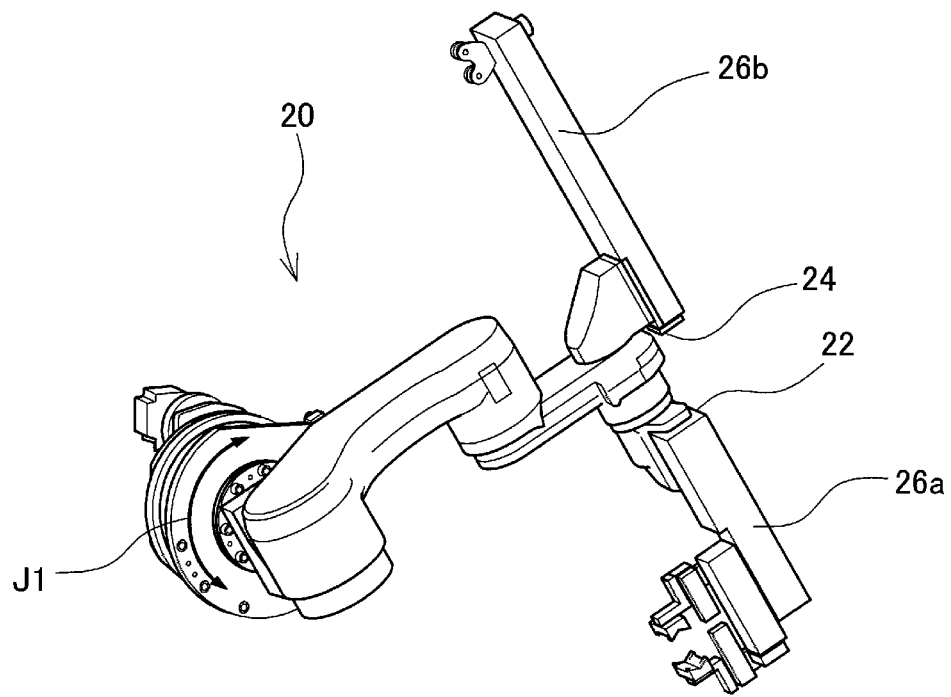
FIG. 3 is a perspective view of the internal robot according to the embodiment, which is in a first tool-following position.

FIG. 3 illustrates a structure in which a hand 26a serving as an end effector is attached to the tool changer 22, and a roller 26b serving as an end effector is attached to the tool changer 24. The controller 36 drives the actuators of the joints J1 to J5 so as to turn the position into the first tool-following position so that the plane of movement of the lathe tool and the plane of movement of the hand 26a are aligned with each other, where various tasks are performed; for example, the workpiece 110 is held by the hand 26a, a temperature of a cutting point is detected by a temperature sensor that is held by the hand 26a, or an image of a cutting point is captured by a camera that is held by the hand 26a.

Figure 4:
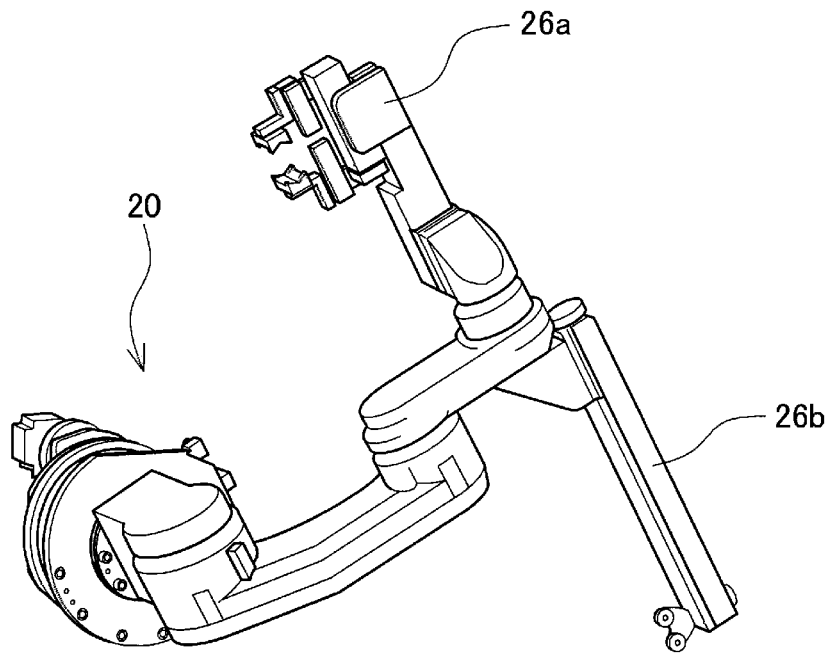
FIG. 4 is a perspective view of the internal robot according to the embodiment, which is in a second tool-following position.

On the other hand, FIG. 4 illustrates a state in which the joint J1 is rotated 180 degrees from the state illustrated in FIG. 3 to turn the position into the second tool-following position; that is, the positions of the hand 26a and the roller 26b are reversed. Displacement such as eccentricity or vibrations of the workpiece 110 can be reduced by using the roller 26b to support the workpiece 110 that is being subjected to a machining process with the plane of movement of the lathe tool and the plane of movement of the roller 26b being aligned with each other.

As a plurality of (for example, two) tool changers 22 and 24 are provided at the distal end of the internal robot 20 as described above to enable attachment of a plurality of end effectors so that a plurality of different end effectors can be used for respective purposes by actuating the joints J1 to J5, a reduction in frequency of changing end effectors can shorten the down time of the machine tool.

In the illustrated embodiment, as the internal robot 20 has robot arm links located offset upward with respect to the tool post 18, the robot arm does not interfere with the tool post 18.

Figure 5:
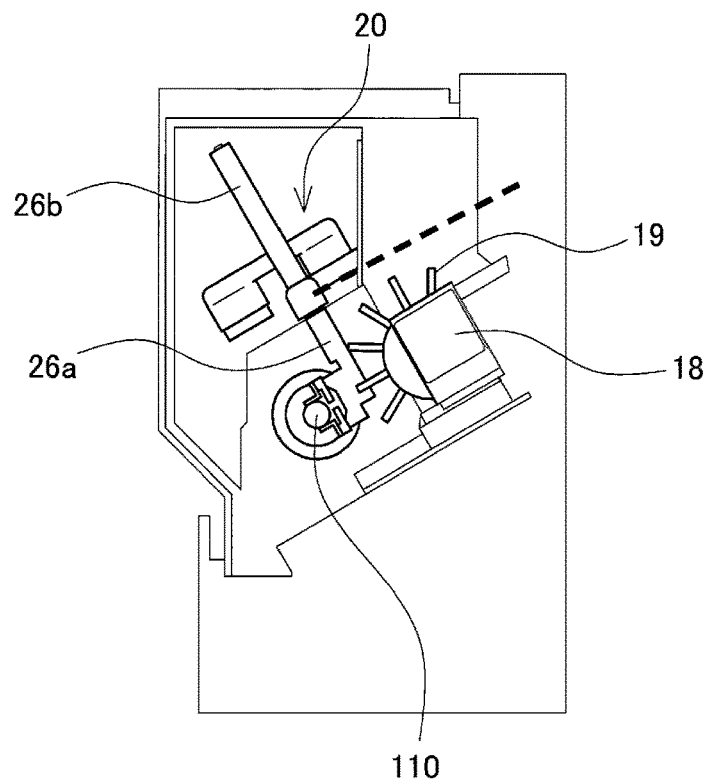
FIG. 5 illustrates a positional relationship between a tool post and links of the internal robot according to the embodiment, which is in the first tool-following position.
Figure 6:
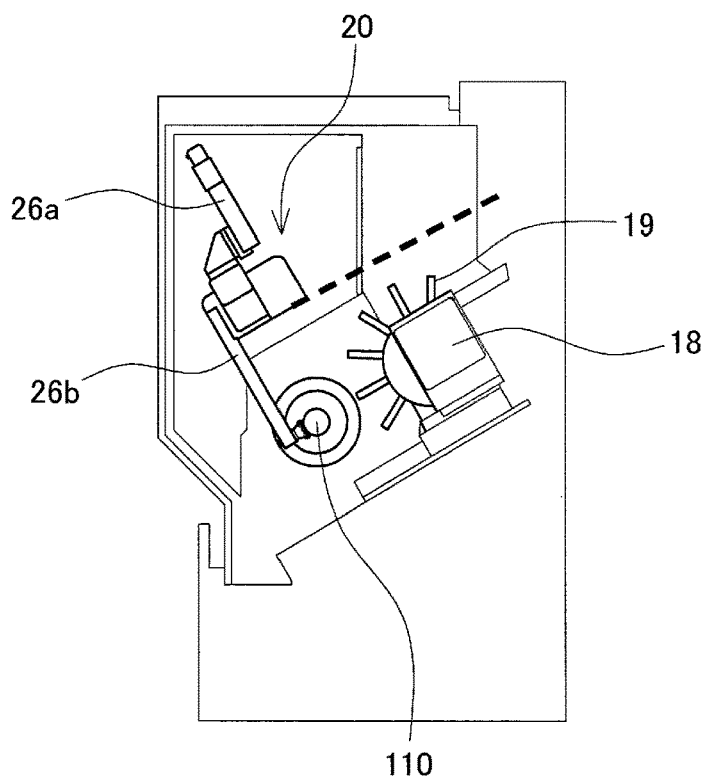
FIG. 6 illustrates a positional relationship between the tool post and the links of the internal robot according to the embodiment, which is in the second tool-following position.

FIGS. 5 and 6 illustrate positional relationships between the internal robot 20 and the tool post 18 as viewed in the Z axis direction.

FIG. 5 illustrates the first tool-following position in which the hand 26a is located at a lower position, and FIG. 6 illustrates the second tool-following position in which the roller 26b is located at a lower position.

As described above, the tool post 18 is movable back and forth in the direction parallel to the X axis, and the X axis is inclined with respect to the horizontal direction such that it goes upward as it goes inward as viewed from the opening of the machining chamber 12. A broken line in each of FIGS. 5 and 6 represents a line that is parallel to the X axis and that passes a point that is located on links of the internal robot 20 (links other than the distal end link, or, specifically, a link that connects between the base portion and the joint J1, a link that connects between the joint J1 and the joint J2, a link that connects between the joint J2 and the joint J3, and a link that connects between the joint J3 and the joints J4 and J5) and closest to the tool post. As can be clearly seen from the positional relationships between this broken line and the tool post 18, the robot arm links of the internal robot 20 are offset upward with respect to the tool post 18, and the internal robot 20 does not interfere with the tool post 18 or with, for example, the turret 19 or the tool 100. In other words, while the workpiece 110 is being machined by the tool 100, the hand 26a (in the position illustrated in FIG. 5) and the roller 26b (in the position illustrated in FIG. 6) can perform their assigned tasks reliably.

Further, the end effector that is not used during a machining process, such as the roller 26b in FIG. 5 or the hand 26a in FIG. 6, also does not interfere with the tool post 18 or with, for example, the turret 19, the tool 100, or the workpiece 110, as it is located at an upper position of the internal robot 20 and is offset further upward with respect to the tool post 18 than is the end effector that is being used.

Although, in the embodiment illustrated in FIGS. 3 to 6, the two tool changers 22 and 24 respectively have attached thereto the hand 26a and the roller 26b serving as the end effectors, the end effectors are not limited to these examples, and, for example, one of the end effectors may be a fluid nozzle.

Figure 7:
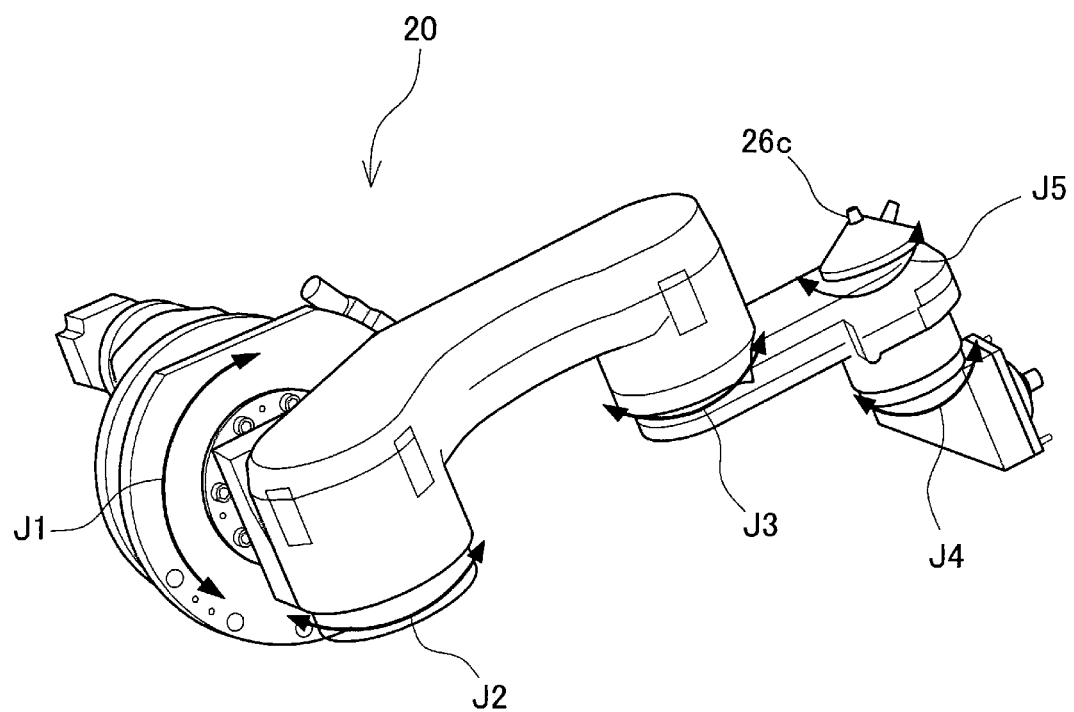
FIG. 7 is a perspective view of an internal robot according to a second embodiment.

FIG. 7 illustrates an embodiment in which the tool changer 24 is not installed, and a fluid nozzle 26c is attached directly as an end effector. For example, cutting water or air can be ejected from the fluid nozzle 26c to, for example, supply cutting water during a machining process or clean the workpiece 110.

Figure 8:
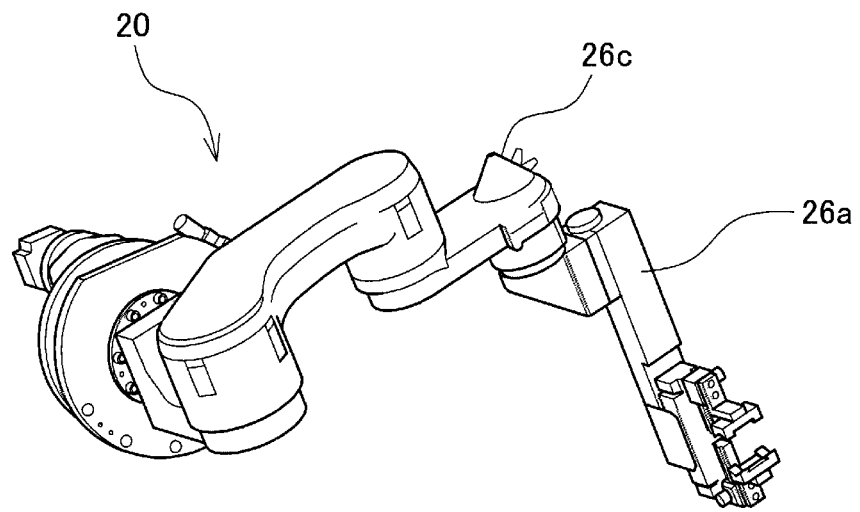
FIG. 8 is a perspective view of the internal robot according to the second embodiment, which is in the first tool-following position.

FIG. 8 illustrates a structure in which the hand 26a serving as an end effector is attached to the tool changer 22. The controller 36 drives the actuators of the joints J1 to J5 so as to turn the position into the first tool-following position so that the plane of movement of the lathe tool and the plane of movement of the hand 26a are aligned with each other, where various different tasks are performed; for example, the workpiece 110 is held by the hand 26a, a temperature of a cutting point is detected by a temperature sensor that is held by the hand 26a, or an image of a cutting point is captured by a camera that is held by the hand 26a.

Figure 9:
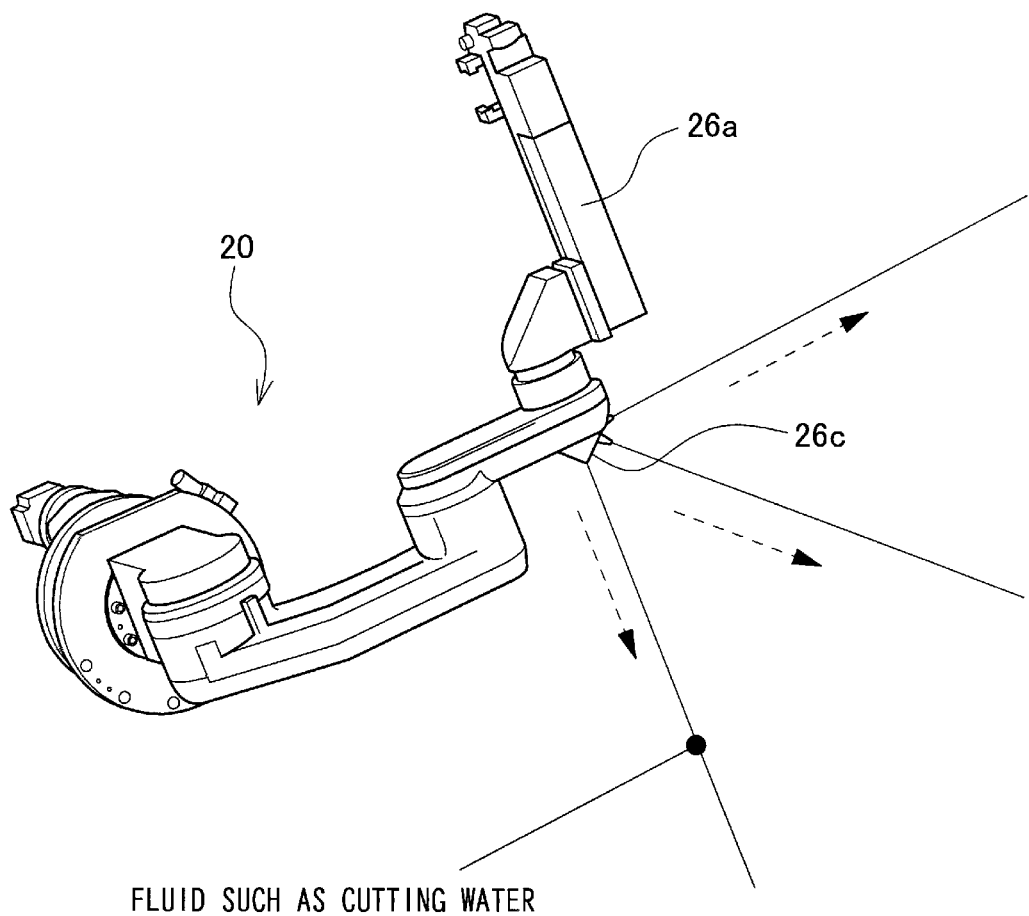
FIG. 9 is a perspective view of the internal robot according to the second embodiment, which is in the second tool-following position.

On the other hand, FIG. 9 illustrates a state in which the joint J1 is rotated 180 degrees from the state illustrated in FIG. 8 to turn the position into the second tool-following position; that is, the positions of the hand 26a and the fluid nozzle 26c are reversed. For example, cutting water or air (in FIG. 9, "fluid such as cutting water") is supplied from the fluid nozzle 26c with the plane of movement of the lathe tool and the plane of movement of the fluid nozzle 26c being aligned with each other.

The size of an end effector itself, such as the fluid nozzle 26c, can be reduced. As illustrated in FIGS. 8 and 9, configuring the fluid nozzle 26c to have a height such that it can pass between two links of the internal robot 20 prevents interference between the end effector and the internal robot 20 and widens the range of motion of the internal robot 20.

Although embodiments of the present disclosure have been described above, the present disclosure is not limited to the above-described embodiments, and various modifications are possible.

For example, although, in the illustrated embodiment, different types of end effectors are individually attached to the two tool changers 22 and 24 and are used for respective purposes, a single end effector may be attached to the two tool changers 22 and 24.

Figure 10:
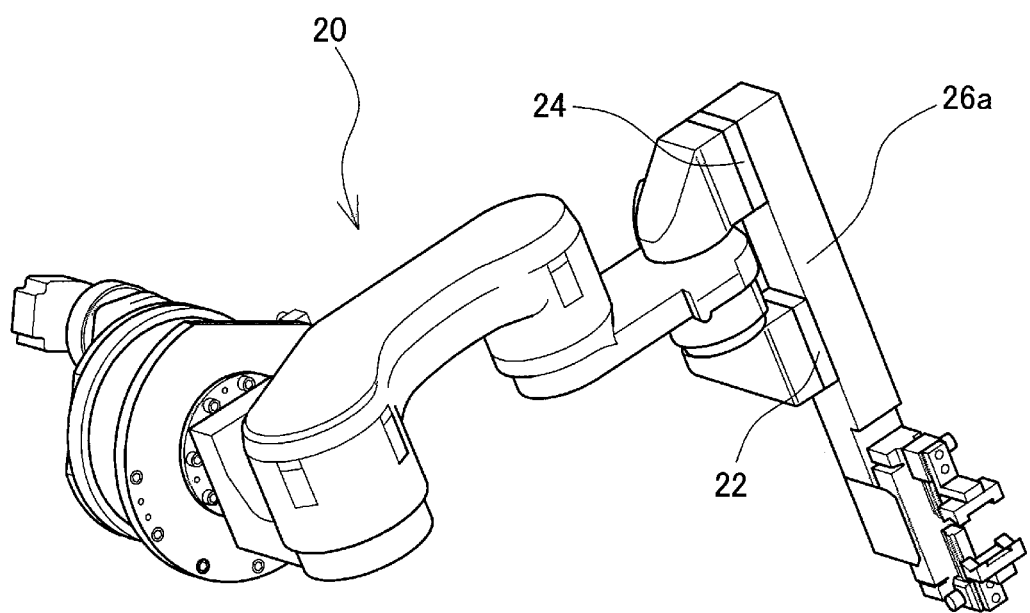
FIG. 10 is a perspective view of an internal robot according to a modification example.

FIG. 10 illustrates an embodiment in which the hand 26a serving as the single end effector is attached to the tool changers 22 and 24. As the single hand 26a is attached to the two tool changers 22 and 24, this hand 26a can carry a heavy load. More specifically, even a heavy load that cannot be carried by the hand 26a that is attached to the tool changer 22 as illustrated in FIG. 3 can be carried by the hand 26a that is attached to the two tool changers 22 and 24 as illustrated in FIG. 10.

A single end effector may have a plurality of functions.

Figure 11:
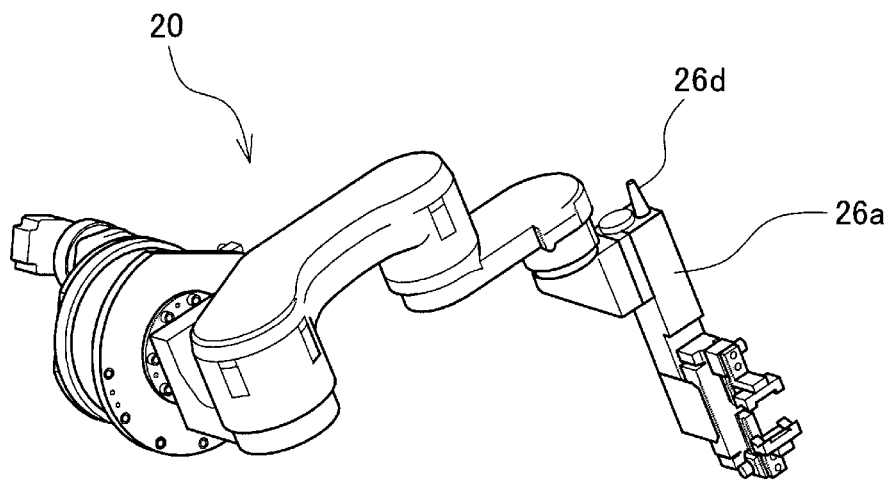
FIG. 11 is a perspective view of an internal robot according to a second modification example, which is in the first tool-following position.

FIG. 11 illustrates an embodiment in which the hand 26a is attached to one end of a single end effector that is attached to the tool changer 22, and a fluid nozzle 26d is attached to the other end of the single end effector. In FIG. 11, for example, the workpiece 110 is held by the hand 26a, a temperature of a cutting point is detected by a temperature sensor that is held by the hand 26a, or an image of a cutting point is captured by a camera that is held by the hand 26a in the first tool-following position in which the hand 26a is located at a lower position, and in which the plane of movement of the lathe tool and the plane of movement of the hand 26a are aligned with each other.

Figure 12:
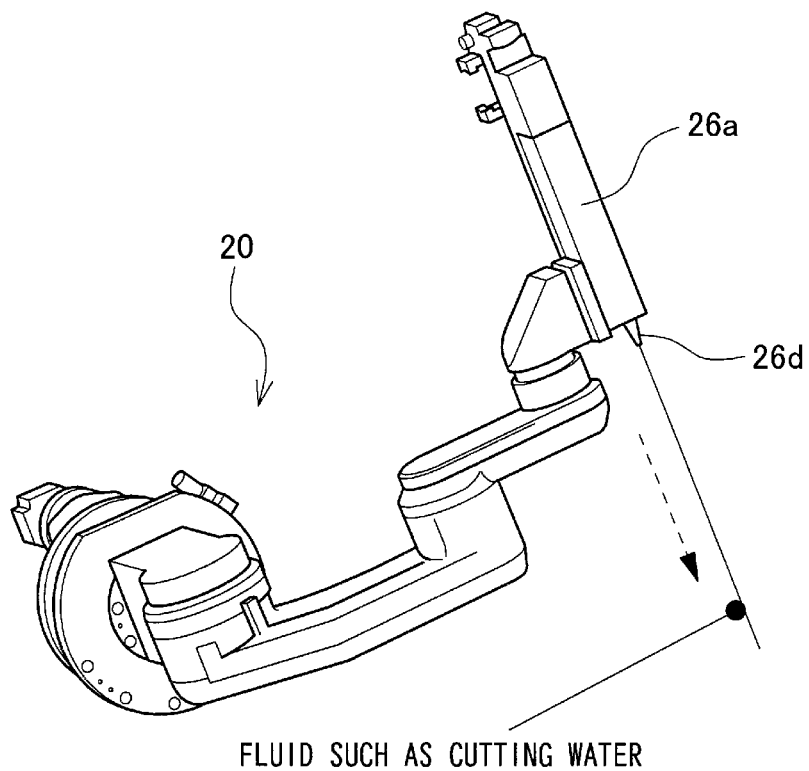
FIG. 12 is a perspective view of the internal robot according to the second modification example, which is in the second tool-following position.

On the other hand, FIG. 12 illustrates a state in which the joint J1 is rotated 180 degrees from the state illustrated in FIG. 11 to turn the position into the second tool-following position; that is, the positions of the hand 26a and the fluid nozzle 26d are reversed. For example, cutting water or air is supplied from the fluid nozzle 26d.

In the structure illustrated in FIGS. 11 and 12, as a plurality of functions can be used for respective purposes by actuating the single end effector to rotate, cost can be further reduced.

The invention claimed is:

1. A machine tool, comprising:
a tool post configured to hold one or more tools, the tool post being linearly movable in a direction parallel to a first axis and in a direction parallel to a second axis that is orthogonal to the first axis;
a workpiece spindle device configured to hold a workpiece rotatably about an axis parallel to the second axis; and
an internal robot placed in a machining chamber, the internal robot having a plurality of joints and a plurality of links connecting the plurality of joints,
wherein the plurality of joints of the internal robot include:
a base joint that is rotatable about an axis parallel to the second axis; and
a plurality of parallel joints that are rotatable about axes that are orthogonal to the axis of rotation of the base joint, the plurality of parallel joints being disposed closer to a distal end of the internal robot than is the base joint,
wherein the distal end of the internal robot is split into at least two branches, wherein the branches are configured such that either: (i) a respective end effector is detachably attachable to each of the branches, or (ii) a single end effector is detachably and collectively attachable to the at least two branches;
wherein the axis of rotation of the base joint is shifted from the axis of rotation of the workpiece spindle device, and
wherein the internal robot is configured to change, upon rotation of the base joint between a first tool-following position in which one of the branches makes access to and follows movement of one of the one or more tools and in which the axes of rotation of the plurality of parallel joints are parallel to a third axis that is orthogonal to the first axis and the second axis, and a second tool-following position in which another of the branches makes access to and follows movement of one of the one or more tools and in which the base joint has been rotated 180 degrees with respect to the first tool-following position, the plurality of links other than a distal end link being attached at positions so as to be free from interference with the tool post and the one or more tools held by the tool post regardless of whether the internal robot is in the first tool-following position or in the second tool-following position.

2. The machine tool according to claim 1, wherein the distal end of the internal robot is split into the at least two branches, to each of which branches a respective end effector is detachably attachable.

3. The machine tool according to claim 2, wherein the at least two branches comprise two branches, wherein a first end effector is detachably attachable to one of the two branches and a second end effector is detachably attachable to the other of the two branches, and
wherein the first end effector is used for a first end effector purpose when the internal robot is in the first tool-following position, and wherein the second end effector is used for a second end effector purpose when the internal robot is in the second tool-following position.

4. The machine tool according to claim 3, wherein at least one of the first end effector and the second end effector is sized to be smaller than a gap between two adjacent links.

5. The machine tool according to claim 3, wherein at least one of the first end effector and the second end effector is selected from a hand, a roller, and a fluid nozzle.

6. The machine tool according to claim 1, wherein the distal end of the internal robot is split into the at least two branches, and
wherein a single end effector is detachably and collectively attachable to the at least two branches.

7. The machine tool according to claim 6, wherein the single end effector is configured to perform a plurality of functions, and
wherein the single end effector is configured to perform a first function of the plurality of functions when the internal robot is in the first tool-following position, and the single end effector is configured to perform a second function of the plurality of functions when the internal robot is in the second tool-following position.

* * * * *